US010353155B2

(12) United States Patent
Abumi et al.

(10) Patent No.: US 10,353,155 B2
(45) Date of Patent: Jul. 16, 2019

(54) MULTI-FIBER OPTICAL CONNECTOR

(71) Applicant: ADAMANT CO., LTD., Tokyo (JP)

(72) Inventors: Masahiro Abumi, Kawaguchi (JP);
Kazuaki Ikegai, Koshigaya (JP);
Nobuhiko Oda, Machida (JP);
Takehiro Hayashi, Kawasaki (JP)

(73) Assignee: ADAMANT NAMIKI PRECISION JEWEL CO., LTD., Tokyo (JP)

( * ) Notice: Subject to any disclaimer, the term of this patent is extended or adjusted under 35 U.S.C. 154(b) by 13 days.

(21) Appl. No.: 15/567,499

(22) PCT Filed: Apr. 20, 2016

(86) PCT No.: PCT/JP2016/002118
§ 371 (c)(1),
(2) Date: Oct. 18, 2017

(87) PCT Pub. No.: WO2016/170782
PCT Pub. Date: Oct. 27, 2016

(65) Prior Publication Data
US 2018/0113260 A1    Apr. 26, 2018

(30) Foreign Application Priority Data
Apr. 20, 2015    (JP) .................................. 2015-086169

(51) Int. Cl.
G02B 6/36    (2006.01)
G02B 6/38    (2006.01)

(52) U.S. Cl.
CPC ............. *G02B 6/3885* (2013.01); *G02B 6/38* (2013.01); *G02B 6/3809* (2013.01); *G02B 6/3839* (2013.01)

(58) Field of Classification Search
CPC .. G02B 6/3825; G02B 6/3885; G02B 6/3874; G02B 6/387; G02B 6/3879; G02B 6/3861; G02B 6/3839
(Continued)

(56) References Cited

U.S. PATENT DOCUMENTS 6,398,424 B1 *  6/2002  Jin .................... G02B 6/3696
385/59
6,491,442 B1   12/2002  Murakami et al.
(Continued)

FOREIGN PATENT DOCUMENTS

JP   H05-323218 A   12/1993
JP   2000-19354 A    1/2000
(Continued)

OTHER PUBLICATIONS

PCT/IB/373, "International Preliminary Report on Patentability for International Application No. PCT/JP2016/002118," dated Oct. 24, 2017.
(Continued)

*Primary Examiner* — Kaveh C Kianni
*Assistant Examiner* — Hung Q Lam
(74) *Attorney, Agent, or Firm* — Manabu Kanesaka

(57) ABSTRACT

Provided is a multi-fiber optical connector which can be easily assembled by having a simple structure and provides high workability at the time of connection.
Since a plate-shaped guide 2 adapted to move a fiber is provided on an end surface and a gap x is provided on a rear surface of the plate-shaped guide 2, achieved is a structure in which each of fibers 5 is mutually moved in an optical axis direction along a penetration hole h provided at the plate-shaped guide 2 at the time of connecting connectors. Consequently, the respective fibers 5 which can be elastically connected independently from each other can be collectively
(Continued)

connected at the time of connecting the connectors, and furthermore, positioning accuracy between the respective fibers 5 can be improved when the connector is used as a multi-fiber optical connector 1.

3 Claims, 4 Drawing Sheets

(58) Field of Classification Search
USPC .............. 385/53, 58–60, 63, 65, 84, 92, 120
See application file for complete search history.

(56) References Cited

U.S. PATENT DOCUMENTS

| 6,565,265 | B2* | 5/2003 | Ohtsuka | G02B 6/25 |
| | | | | 385/60 |
| 2003/0161584 | A1* | 8/2003 | Ohtsuka | G02B 6/3882 |
| | | | | 385/60 |
| 2003/0174971 | A1 | 9/2003 | Shigenaga et al. | |
| 2004/0071407 | A1 | 4/2004 | Vergeest | |
| 2008/0019645 | A1 | 1/2008 | Ikunishi | |
| 2009/0175581 | A1 | 7/2009 | Ikunishi | |
| 2015/0104135 | A1* | 4/2015 | Bushnell | G02B 6/325 |
| | | | | 385/79 |

FOREIGN PATENT DOCUMENTS

| JP | 2000-304978 A | 11/2000 |
| JP | 2001-83334 A | 3/2001 |
| JP | 2003-248139 A | 9/2003 |
| JP | 4032973 B2 | 1/2008 |
| JP | 2008-26458 A | 2/2008 |
| JP | 5462080 B2 | 4/2014 |

OTHER PUBLICATIONS

PCT/ISA/237, "Written Opinion of the International Searching Authority for International Application No. PCT/JP2016/002118," dated Jul. 26, 2016.
PCT/IB/326, "Notification Concerning Transmittal of International Preliminary Report on Patentability for International Application No. PCT/JP2016/002118," dated Nov. 2, 2017.
PCT/ISA/210, "International Search Report for International Application No. PCT/JP2016/002118" dated Jul. 26, 2016.
PCT/ISA/237, "Written Opinion of the International Search Authority for International Application No. PCT/JP2016/002118" dated Jul. 26, 2016.

* cited by examiner

MULTI-FIBER OPTICAL CONNECTOR

RELATED APPLICATIONS

The present application is National Phase of International Application No. PCT/JP2016/002118 filed Apr. 20, 2016, and claims priority from Japanese Application No. 2015-086169, filed Apr. 20, 2015, the disclosure of which is hereby incorporated by reference herein in its entirety.

TECHNICAL FIELD

The present invention relates to a multi-fiber optical connector attached to one end of an optical cable and adapted to collectively connect a plurality of fibers.

BACKGROUND ART

Presently, a transmission medium in which a plurality of optical fibers such as a tape core wire and an optical cable are bundled are widely used in the field of optical communication. In such a transmission medium in the related art, each of the fibers is connected by fusion splice, and while respective fiber cores to be connected can be coaxially fixed with high accuracy, there may be disadvantages in which workability at the time of connecting each fiber is low and a length of a fiber is needed to have a certain amount of margin because of a method thereof. Considering such situations, recently used are multi-fiber optical connectors represented by JP 4032973 B (hereinafter referred to as Patent Literature and JP 5462080 B (hereinafter referred to as Patent Literature 2). Here, the connector disclosed in Patent Literature 1 optimizes a buckling amount of a fiber tip at the time of connector connection by defining a tip shape of each fiber fixed to an end surface of the connector. Therefore, highly accurate coaxial fixation and improvement of connection reliability are achieved at the time of physical contact (PC) connection by the multi-fiber optical connector. Additionally, according to the connector disclosed in Patent Literature 2, effects are obtained in which an assembling time is shortened and a cost is reduced by providing a connector structure of a multi-fiber ferrule connected inside a guide provided separately.

CITATION LIST

Patent Literature

Patent Literature 1: JP 4032973 B
Patent Literature 2: JP 5462080 B

SUMMARY OF INVENTION

Technical Problem

While above-described effects are obtained, a connector disclosed in Patent Literature 1 has a problem in which a plurality of fibers is needed to be polished with high accuracy while being fixed to a multi-fiber connector due to a structure thereof. Additionally, according to a connector disclosed in Patent Literature 2, optical axes between the connectors are needed to be aligned at the time of connection thereof by using a separate member, thereby degrading workability.

Considering the above-described problems, the present invention is directed to providing a multi-fiber optical connector which can be easily assembled by having a simple structure and provides high workability at the time of connection.

Solution to Problem

To achieve the above objects, an optical multi-fiber connector according to the present invention is characterized in holding a fiber by using a plate-shaped guide and also providing a gap on a rear surface of the guide. More specifically, provided is a technical feature in which a plate member located at a tip of the multi-fiber optical connector is provided with a plurality of penetration holes in each of which a fiber is moved while each fiber core is kept in an optical axis direction.

Additionally, the optical multi-fiber connector according to the present invention is characterized in having the plate-shaped guide partly provided with an abutting surface adapted to set a reference surface in a horizontal direction of an end surface of the connector at the time of connecting connectors. More specifically, provided is a technical feature in which in the case of positioning, in a horizontal direction, a plurality of fibers to be fixed by a positioning pin and the like, the reference surface in the horizontal direction between the connectors facing each other is constituted by the abutting surface.

Furthermore, the optical multi-fiber connector according to the present invention is technically characterized in filling the gap with a flexible adhesive to protect a fiber in the gap portion from mixture of a foreign matter.

Additionally, the optical multi-fiber connector according to the present invention is a multi-fiber optical connector adapted to connect a plurality of fibers, and is technically characterized in including:

a fiber guide including: a fixing portion to which the plurality of fibers is fixed; a plurality of entrance holes to allow the plurality of fibers to enter the fixing portion from the outside; a plurality of insertion holes through which tips of the plurality of fibers fixed in the fixing portion are inserted from the fixing portion;

a holder having an opening on a rear surface side and adapted to hold the fiber guide inserted from the opening;

a plate-shaped guide arranged on an end surface portion of the holder and including a plurality of penetration holes through which tip portions of the plurality of fibers are inserted in a state each movable in an optical axis direction; and a gap formed on a rear surface side of the plate-shaped guide and adapted to allow deflection of the fibers.

Moreover, the optical multi-fiber connector according to the present invention is technically characterized in that a window portion adapted to expose the fixing portion is formed at the fiber guide.

Advantageous Effects of Invention

According to the present invention, it is possible to provide a multi-fiber optical connector in which the connector can be easily assembled by having a simple structure and high workability is provided by the plate-shaped guide at the time of connection. In other words, according to the multi-fiber optical connector described in the present application, used is a structure in which a connector ferrule is adopted as the plate-shaped guide by applying drilling processing to a plate member. Therefore, a main portion can be formed only by inserting a fiber into the plate-shaped guide at the time of assembling the connector, and assembly thereof can be easily performed. Additionally, positioning accuracy can be improved in use as a connector by forming the plate-shaped guide as a single component serving as a guide of each fiber. This effect can be obtained in addition to the above effects because each of the fibers can be mutually moved in the optical axis direction at the time of connecting the connectors, and a tip portion of each of the fibers is held in a movable state.

More specifically, as for the holding structure, the gap is provided on the rear surface of the plate-shaped guide in the present invention, thereby absorbing a buckling amount caused by movement of each fiber and also elastically supporting the tip portion by using resilience of the bucking portion. Therefore, according to the present invention, fibers can be used in a state that a projecting length each thereof generated at a tip of the multi-fiber optical connector is different from each other. Additionally, according to the present invention, a buckling amount caused by contacting and pressurizing between tip portions of fibers facing each other is absorbed in the gap at the time of connecting the connectors. More specifically, the fiber is moved in the optical axis direction along the penetration hole provided at the plate-shaped guide due to the structure. Therefore, fiber cores that can be elastically connected in a manner independent from each other can be collectively and elastically connected by aligning positions of plate-shaped guides. Meanwhile, as an alignment method between the plate-shaped guides, a method of providing a positioning pin in each of the plate-shaped guides or a method of providing a positioning fixing member in the connector itself may be exemplified. Additionally, since the above-described elastic connection is used, respective fibers can be collectively connected without applying highly accurate polishing to tip portions of the fibers.

Furthermore, in the present invention, the projecting length of the fiber is set to a length in which fiber core connection can be kept by the penetration hole provided at the plate-shaped guide. More specifically, the projecting length is the length in which loss of each fiber core with respect to a facing fiber core is suppressed within a certain range at the time of connecting the connectors, and connection can be kept by movement inside the penetration hole. Since an angle of the penetration hole is also processed in a similar range, the multi-fiber optical connector of the present invention can connect respective fiber cores each other with low loss even in the state that projecting lengths are different from each other as described above.

In addition to the above-mentioned effects, used in the present invention is the structure in which the abutting surface is partly formed in the plate-shaped guide for mutual abutment. Therefore, when a positioning pin and the like is used at the time of connecting the connectors, fiber cores can be mutually connected with high accuracy and positioning accuracy can be easily improved. The effects are provided by the structure partly including the abutting surface. In other words, in the present embodiment, the reference surfaces are aligned with high accuracy by using the abutting surface as reference surfaces for plate-shaped guides facing each other at the time of connection when positioning for the plate-shaped guides are to be performed. Furthermore, since the abutting surface is only partly formed, effects can be obtained in which a processing amount of the abutting surface that requires high surface accuracy is reduced and a protruding amount of a fiber can be easily set at the time of connecting the connectors. Additionally, workability at the time of connecting the connectors can be significantly improved by the above-described positioning as well as the entire structure including the abutting surface.

Moreover, by using the present invention, the gap is protected from mixture of a foreign matter and reliability as a connector can be improved while keeping the above-described functions and effects.

As described above, according to the present invention, it is possible to provide a multi-fiber optical connector which can be easily assembled by having the simple structure and provides high workability at the time of connection.

DESCRIPTION OF EMBODIMENTS

In the following, the best embodiment of the present invention will be described using FIGS. 1, 2, 3, and 4.

Figure 1:
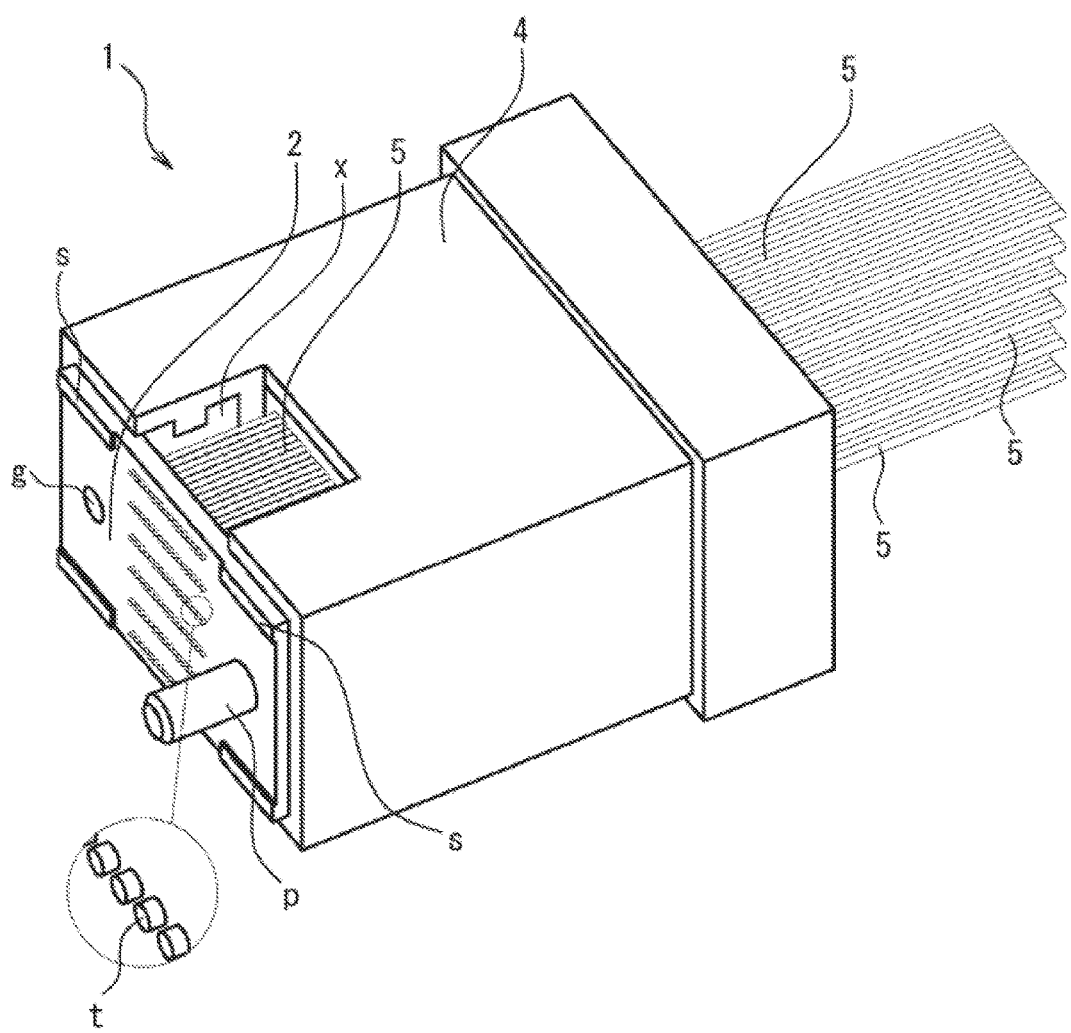
FIG. 1 is a perspective view of an entire multi-fiber optical connector used in an embodiment of the present invention.
Figure 2:
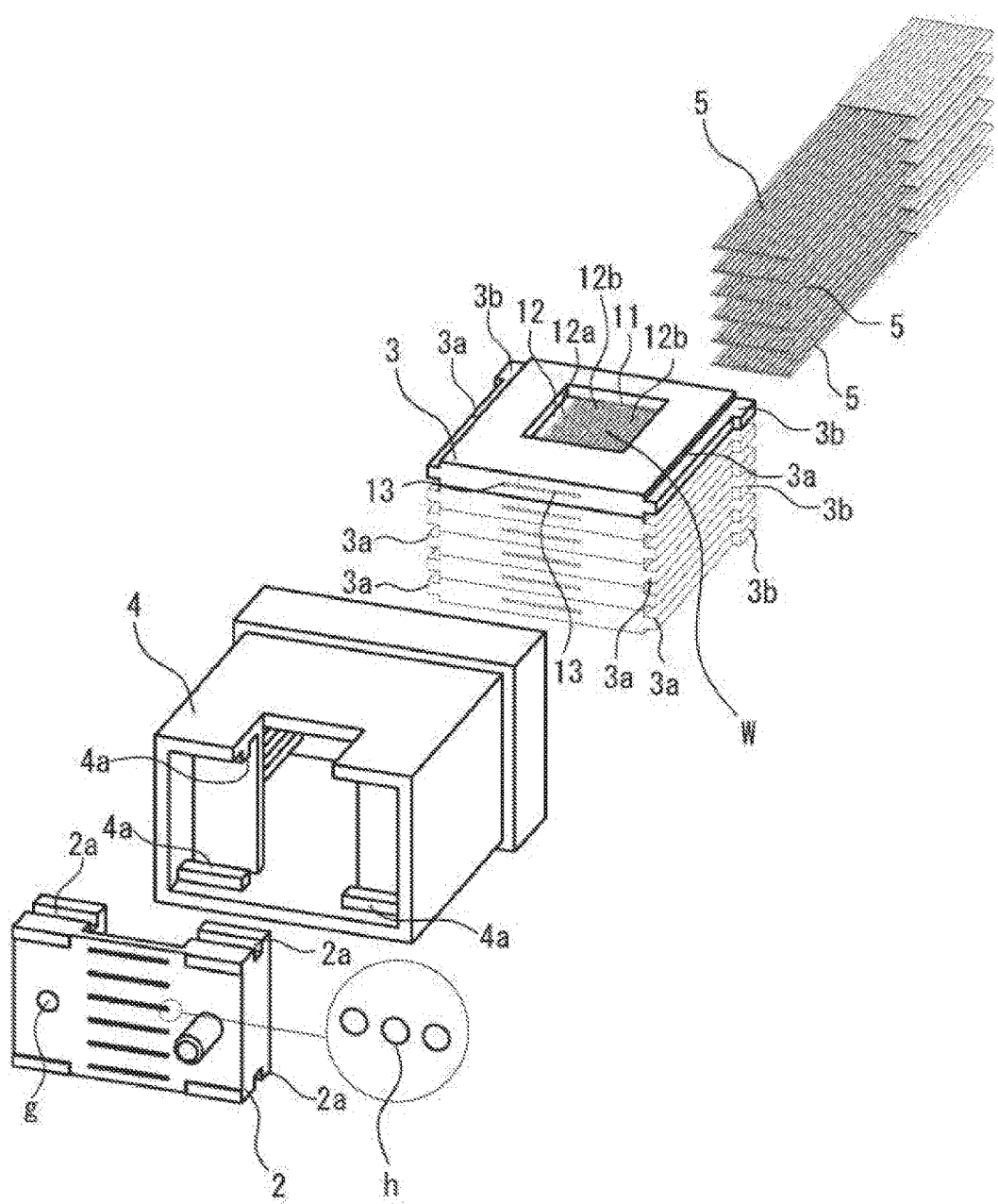
FIG. 2 is an exploded perspective view of the multi-fiber optical connector illustrated in FIG. 1.
Figure 3:
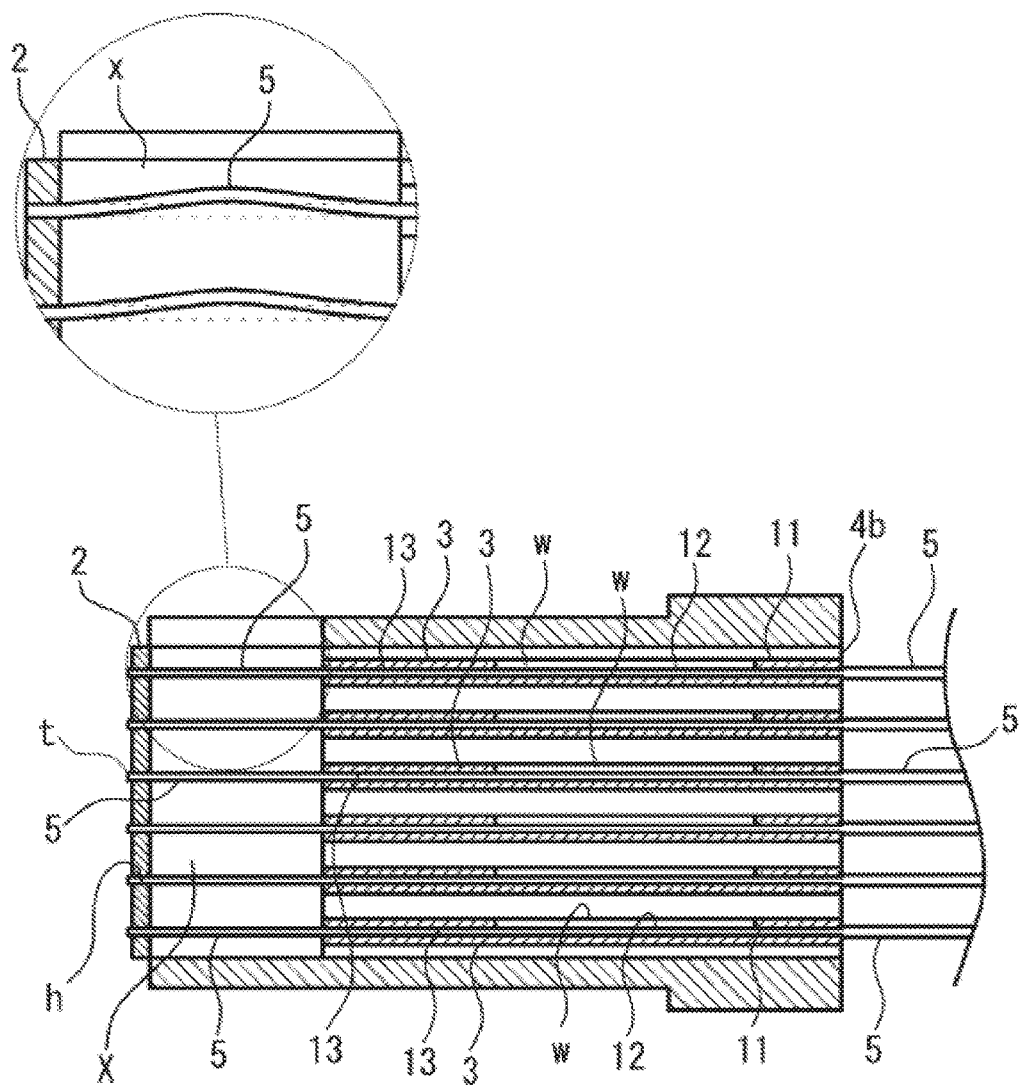
FIG. 3 is a side cross-sectional explanatory view illustrating a connected state of the multi-fiber optical connector illustrated in FIG. 1.
Figure 4:
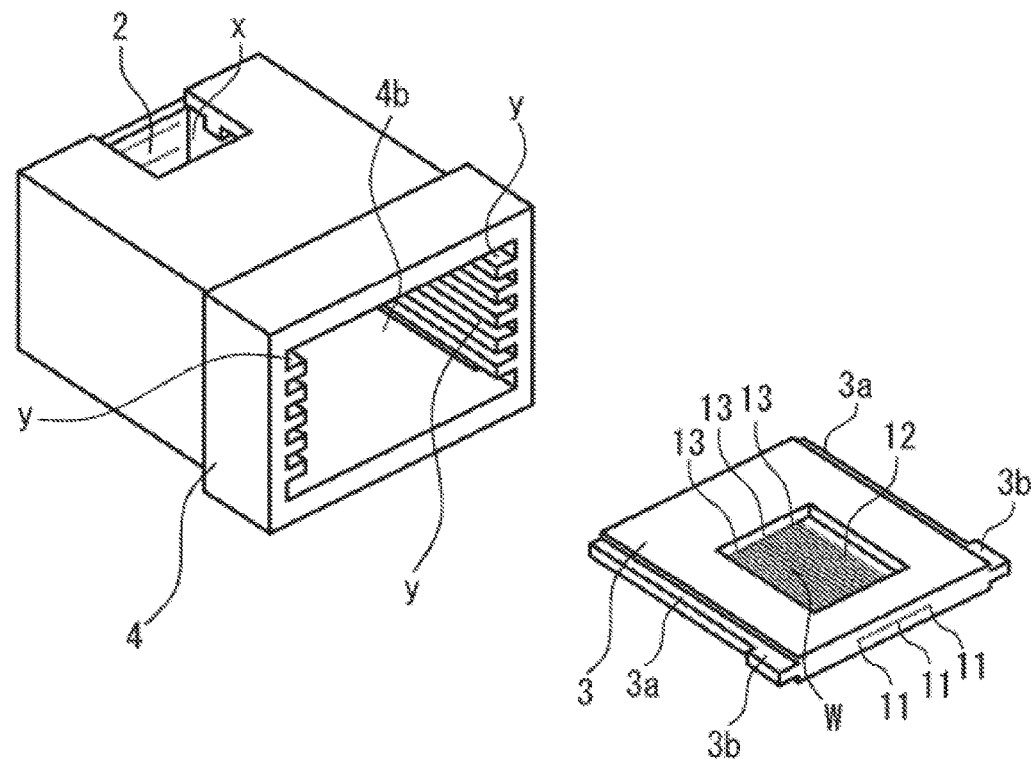
FIG. 4 is an exploded perspective view of the multi-fiber optical connector illustrated in FIG. 1

FIG. 1 is a perspective view of an entire multi-fiber optical connector used in the present embodiment, FIG. 2 is an exploded perspective view of the multi-fiber optical connector, FIG. 3 is a side cross-sectional explanatory view illustrating a structure inside the connector when the multi-fiber optical connector is connected, and FIG. 4 is an exploded perspective view of the multi-fiber optical connector, respectively. Note that illustration of a rear end portion of a fiber is omitted in the drawings.

As illustrated in FIGS. 1, 2, and 3, a multi-fiber optical connector 1 according to the present embodiment includes a plate-shaped guide 2, a fiber guide 3, and a holder 4, and has a structure in which a tip portion t of a fiber 5 inserted into a penetration hole h provided inside the plate-shaped guide 2 from a rear end side of the multi-fiber optical connector 1 is arranged in a protruding manner in a state movable in an optical axis direction. Additionally, each fiber 5 is formed through the fiber guide 3, namely, in the fiber guide 3, and fixed to the holder 4 while passing through: each of a plurality of entrance holes 11 to allow each of a plurality of the fibers 5 to enter a fixing portion 12 from outside; the fixing portion 12 in which the plurality of fibers 5 having entered from the entrance holes 11 is fixed; and each of a plurality of insertion holes 13 through each of which a tip of each of the plurality of fibers 5 fixed to the fixing portion 12 is inserted. Therefore, lengths of the tip portions t of the protruding fibers 5 can be easily aligned by fixing the plate-shaped guide 2 to the holder 4.

Additionally, as illustrated in FIG. 2, a window portion w where the fixing portion 12 is exposed is provided at a center portion of the fiber guide 3, and a fiber 5 is fixed to each fiber guide 3 by applying a fixing adhesive to the window portion w. A bottom surface 12*a* of the fixing portion 12 of the fiber guide 3 has a plurality of grooves 12*b* formed in a longitudinal direction, in other words, continuously formed in a direction parallel to a direction in which the fiber guide 3 is inserted into the holder 4, and each of the grooves 12*b* can be applied with a fixing adhesive (not illustrated) from the window portion w in a state that each of the fibers 5 is arranged along each of the grooves. Since each of the fibers 5 is one by one fixed to the fiber guide 3 along each of the plurality of grooves 12b, a length of a tip portion t of a fiber 5 can be set per groove by adjusting a fixing position in the fiber guide 3. Meanwhile, in the present embodiment, ceramics (partially stabilized zirconia including yttria) is used as a material of the plate-shaped guide 2, and achieved is a structure in which a base end of a positioning pin p made of metal is embedded and a top end thereof is formed in a protruding manner. Furthermore, a positioning hole g adapted to determine a position of the multi-fiber optical connector 1 by inserting the positioning pin p into the positioning hole g is formed at a position facing the positioning pin p when the multi-fiber optical connectors 1 are made to face each other, and positions of the multi-fiber optical connectors 1 facing each other can be determined more correctly by inserting the positioning pin p into the positioning hole g. Therefore, achieved are effects in which an abutting surface s is not deformed even after long-term use or at the time of attachment and detachment, and the hole is not also deformed by insertion of the positioning pin p at the time of mutually connecting the multi-fiber optical connectors 1. Additionally, obtained is an advantage in which heat influence caused by fiber processing is hardly received when a tip of a fiber 5 is subjected to laser-cleaving after assembly.

Meanwhile, as illustrated in FIG. 2, a plurality of fixing grooves 2a is formed at a rear portion of the plate-shaped guide 2, and a plurality of fixing pieces 4a to be fitted into the fixing grooves 2a is formed, on an end surface portion of the holder 4, at positions corresponding to positions where the fixing grooves 2a are formed. Additionally, the plate-shaped guide 2 is installed and fixed to the holder 4 to be one integrated body by fitting the fixing pieces 4a into the corresponding fixing grooves 2a. When the plate-shaped guide 2 and the holder 4 are integrated, a gap x is formed on a rear surface of the plate-shape guides 2. Meanwhile, the plate-shaped guide 2 and the holder 4 may have a relation as follows: the plate-shaped guide 2 preliminary formed separately is fitted to the holder 4, thereby being installed and fixed; or a resin material is used for the plate-shaped guide 2 so as to be integrally molded. Additionally, other methods may also be applied.

Furthermore, as illustrated in FIG. 3, used in the present embodiment is a structure in which a tip portion t of a fiber 5 fixed to the fiber guide 3 is directly inserted through the penetration hole h provided at the plate-shaped guide 2, and is kept in a state movable in an optical axis direction inside the penetration hole h. Therefore, at the time of assembling the connector 1, optical axes between the fibers 5 can be adjusted per the fiber 5 at the time of connecting the multi-fiber optical connectors 1 to each other. In other words, in the present embodiment, each of the fibers 5 is fixed to the holder 4 via the fiber guide 3. At this point, a projecting strip 3a horizontally projecting in a direction orthogonal to an insertion direction and a projecting portion 3b projecting wider than the projecting strip 3a at a rear portion of the fiber guide 3 are formed on two surfaces of the fiber guide 3 which are parallel to the insertion direction into the holder 4 and face each other. The projecting strip 3a is formed so as to have a size and a width to be fitted in a fiber guide groove portion y formed at the holder 4. Additionally, the fiber guide 3 is inserted and fixed into the holder 4 by being made to closely contact the fiber guide groove portion y with the projecting portion 3b after being inserted into the fiber guide groove portion y.

Furthermore, at this point, since the gap x is provided between the plate-shaped guide 2 and each fiber guide 3 in the plate-shaped guide 2, a tip portion t of each fiber 5 is moved while being guided along the penetration hole h inside the plate-shaped guide 2 in a state that end surfaces are made to abut each other at the time of connecting the connectors 1. Here, since movement of the tip portion t of each fiber 5 is absorbed by buckling of each fiber 5 in the gap x as illustrated in the enlarged view in FIG. 3, respective fiber cores which can be elastically connected in a manner independent from each other can be collectively connected by aligning the plate-shaped guides 2 each other by using each of the positioning pins p and the abutting surfaces s. Meanwhile, a projecting length of a tip portion t of each fiber 5 is set shorter than a fiber length in the gap x. Therefore, workability during assembly and during connection can be improved by suppressing loss of the tip portion t of the fiber 5 at the time of connecting the connectors 1 while accommodating a buckling portion of the fiber 5 in the gap x. Note that the same effects can be obtained when the gap x is filled with a flexible adhesive in view of optical fiber protection.

Additionally, in the present embodiment, the plate-shaped guides 2 are aligned each other by using the positioning pin p, the positioning hole g provided in each of the plate-shaped guides 2 as well as the abutting surfaces s provided at four corners in each of the plate-shaped guide 2 as illustrated in FIGS. 1 and 2. Therefore, the abutting surface s that requires high accuracy at the time of connecting the connectors 1 can be easily processed. In other words, while an abutting position between respective fibers 5 can be fixed by positioning by using a positioning pin p, a reference surface at the time of connecting the multi-fiber optical connectors 1 is hardly set. Since the multi-fiber optical connector 1 of the present embodiment includes the abutting surfaces s at the four corners, the reference surface can be constituted while minimizing a processed portion required to have high surface accuracy, and connection between the fiber cores can be kept in a stable state. Additionally, since the processed portion is minimized, a manufacturing cost for a single multi-fiber optical connector 1 can be also reduced.

Meanwhile, as it can be grasped from FIG. 4, the present embodiment has a structure in which the holder 4 includes an opening 4b on the rear surface side and also includes the fiber guide groove portion y on an inner wall thereof, and the holder 4 and the plate-shaped guide 2 are integrated by insert molding. Therefore, a fiber 5 can be easily inserted into a penetration hole h of the plate-shaped guide 2 at the time of assembling the multi-fiber optical connector 1, the number of components of the entire multi-fiber optical connector 1 can be reduced, and man-hour required for assembly can be reduced. Additionally, further effects can be obtained in which reliability of the multi-fiber optical connector 1 is improved by stably connecting fiber cores, and workability at the time of connecting the multi-fiber optical connectors 1 is improved.

As described above, with the multi-fiber optical connector 1 according to the present invention, it is possible to provide the multi-fiber optical connector which can be easily assembled by having a simple structure and provides high workability at the time of connection.

REFERENCE SIGNS LIST

1 Multi-fiber optical connector
2 Plate-shaped guide
2a Fixing groove
3 Fiber guide 3a Projecting strip
3b Projecting portion
4 Holder
4a Fixing piece
4b Opening
5 Fiber
11 Entrance hole
12 Fixing portion
12a Bottom surface
13 insertion hole
h Penetration hole
g Positioning hole
p Positioning pin
s Abutting surface
t Tip portion
w Window portion
x Gap
y Fiber guide groove portion

The invention claimed is:

1. A multi-fiber optical connector, comprising:
a fiber guide including:
a fixing portion to which a plurality of fibers is configured to be fixed;
a plurality of entrance holes adjacent to the fixing portion at one side of the fixing portion, through which the plurality of fibers is configured to enter the fixing portion from an outside,
a plurality of insertion holes adjacent to the fixing portion at another side of the fixing portion, through which tips of the plurality of fibers are configured to be inserted from the fixing portion to be projected,
two side surfaces opposite to each other, each extending in a direction parallel to an insertion direction of the fiber guide, and
a first projecting strip and a second projecting strip formed on each of the two side surfaces and horizontally projecting in a direction orthogonal to the insertion direction of the fiber guide, the second projecting strip having a projecting length wider than that of the first projecting strip;
a holder to which the fiber guide is fixed to be configured to connect the plurality of fibers, the holder including an opening formed at a rear surface side of the holder, through which the fiber guide is inserted, and a fiber guide groove portion extending in the insertion direction of the fiber guide to hold the fiber guide inserted in the holder;
a plate-shaped guide arranged at a front surface side of the holder and including a plurality of penetration holes through which the tip portions of the plurality of fibers projecting from the fiber guide are configured to be inserted in a state wherein each of the tip portions of the plurality of fibers is movable in an optical axis direction of the plurality of fibers; and
a gap formed between the plate-shaped guide and the fiber guide in the holder and configured to allow deflection of each of the plurality of fibers,
wherein the fiber guide, the holder, and the plate-shaped guide are separately formed each other, and
the plate-shaped guide includes a plurality of fixing grooves on an upper portion and a lower portion, each extending in the direction orthogonal to the insertion direction of the fiber guide, and the holder includes a plurality of fixing pieces on an upper portion and a lower portion at the front surface side, each extending in the direction orthogonal to the insertion direction of the fiber guide to be engaged in the plurality of fixing grooves such that the plate-shaped guide is fixed to the holder.

2. The multi-fiber optical connector according to claim 1, wherein the plate-shaped guide includes a positioning pin configured to be inserted in a positioning hole of another multi-fiber optical connector, and a positioning hole in which a positioning pin of another multi-fiber optical connector is configured to be inserted so that the multi-fiber optical connector engages the another multi-fiber optical connector.

3. The multi-fiber optical connector according to claim 2, further comprising another fiber guide arranged on the fiber guide,
wherein the fiber guide and the another fiber guide are vertically aligned with each other to be housed in the holder.

* * * * *